Patented Oct. 31, 1950

2,527,837

UNITED STATES PATENT OFFICE 2,527,837

SYNTHESIS OF BETA-SUBSTITUTED PROPIONALDEHYDES

Owen A. Moe and Donald T. Warner, Minneapolis, Minn., assignors to General Mills, Inc., a corporation of Delaware No Drawing. Application November 1, 1947, Serial No. 783,612

9 Claims. (Cl. 260—313)

The present invention relates to beta-substituted propionaldehydes and to the synthesis of such compounds. More particularly it relates to beta-imidopropionaldehydes, especially beta-phthalimidopropionaldehyde and beta-succinimidopropionaldehyde.

It is, therefore, an object of the present invention to provide novel beta-imidopropionaldehyde compounds, and to provide a process for their synthesis.

It has been discovered that it is possible to synthesize these compounds by the 1,4 addition of imido compounds, such as succinimide and phthalimide to acrolein and substituted acroleins. The reaction may be illustrated by the following equation which demonstrates the reaction between phthalimide and acrolein:

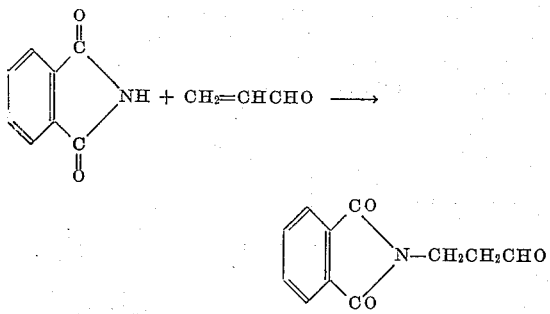

This reaction may be carried out in a suitable solvent such as ethanol, using a catalytic amount of an alkaline catalyst such as sodium ethoxide. The reaction proceeds smoothly at room temperature. Upon completion of the reaction, the reaction mixture is acidified and concentrated in vacuo, after which it is treated with benzene to yield the aldehydo compound as a pasty solid. This material may then be converted to the phenylhydrazone and the 2,4-dinitrophenylhydrazone for purposes of identification. Other solvents such as benzene may also be employed in the reaction. Likewise other basic catalysts such as tertiary amines and the like, may be used. While the reaction temperature is indicated as being about room temperature, it is also possible to employ somewhat more elevated temperatures.

The reaction is applicable to acroleins and substituted acroleins such as methacrolein (alpha-methyl acrolein) and crotonaldehyde. The methacrolein is somewhat more reactive than the crotonaldehyde and the reaction proceeds more readily.

The following examples will serve to illustrate the invention:

EXAMPLE 1

*Preparation of beta-phthalimidopropionaldehyde*

To an alcoholic solution containing 110 ml. of absolute ethanol and 0.15 g. of sodium was added 44.1 g. of phthalimide. The resulting reaction mixture was stirred at approximately 25° C. The greater portion of the phthalimide remained suspended in the reaction mixture. Twenty-five ml. of acrolein in 15 ml. of absolute ethanol was added dropwise over a 20-minute period. When the addition of the acrolein was complete, the reaction temperature had increased to 51° C. The reaction mixture was stirred for an additional 20-minute period, at which time the temperature had decreased to 35° C. and a nearly clear reaction solution resulted. After standing overnight the reaction mixture was neutralized by adding the requisite quantity of glacial acetic acid, and after filtration the reaction mixture was concentrated in vacuo to a viscous syrup. One hundred ml. of benzene was added and the benzene was removed by concentration in vacuo. A viscous pasty solid resulted. The resulting crude solid material was mixed with 100 ml. of benzene and upon standing a precipitate was formed. The precipitated product was collected by filtration and dried. It melted at 108–115° C.

The crude aldehydo compound thus obtained was treated with phenylhydrazine, acetic acid and ethanol in the usual manner, and the crystalline phenylhydrazone thus obtained melted at 117–119° C. After purification by crystallization from ethanol, the melting point was increased to 121.5–122.5° C. Anal. Calc. for: $C_{17}H_{15}O_2N_3$ N 14.33; Found: N 14.72. Likewise, treatment of the crude aldehydo compound with 2,4-dinitrophenylhydrazine in the usual manner yielded the 2,4-dinitrophenylhydrazone which melted at 200–203° C. After purification by crystallization from aqueous acetone, the melting point increased to 209–210° C. Anal. Calc. for: $C_{17}H_{13}O_6N_5$; C 53.26 H 3.42 N 18.28; Found: C 53.24 H 3.55 N 18.23.

EXAMPLE 2

*Preparation of beta-succinimidopropionaldehyde*

Nineteen and eight-tenths (19.8) g. of succinimide were added to an alcoholic solution containing 50 ml. of absolute ethanol and 0.05 g. of metallic sodium. The alcoholic suspension of the succinimide was cooled to 6° C. by means of an ice bath. The ice bath was removed and acrolein (11.2 g.) was added dropwise. The reaction temperature increased rapidly to 31° C. and this temperature was maintained by cooling and by varying the rate of the addition of the acrolein. After the addition of the acrolein was complete, the reaction mixture was stirred for an additional 35-minute period. A clear, water-white solution resulted. After standing for two and one-half hours the reaction mixture was acidified to litmus with the requisite quantity of glacial acetic acid. The reaction mixture was concentrated in vacuo and a thick syrupy liquid resulted.

The above crude aldehydo compound was treated with 2,4-dinitrophenylhydrazine in the usual manner, and the crystalline 2,4-dinitrophenylhydrazone was collected by filtration. It melted at 167–175° C. After purification by crystallization from a 50–50 volume percent ethanol-acetone mixture, the 2,4-dinitrophenylhydrazone of beta-succinimidopropionaldehyde melted at 183.5–184.5° C. Anal. Calc. for: $C_{13}H_{13}O_6N_5$; N 20.89; Found: N 20.68.

EXAMPLE 3

Reaction between methacrolein and succinimide

To an alcoholic solution containing 60 ml. of aqueous alcohol and 0.02 g. of sodium were added 3.3 g. of succinimide. The succinimide only partially dissolved in the alcohol solution. However, complete solution was effected after 2.7 cc. of methacrolein (redistilled and stabilized with hydroquinone) had been added. The resulting reaction mixture was stirred for a period of 45 minutes. The resulting reaction mixture was concentrated in vacuo to approximately 40 cc.

The alcoholic solution of the aldehydo compound was treated with 2,4-dinitrophenylhydrazine in the usual manner and the resulting light orange solution was filtered and permitted to stand at room temperature overnight. The crystalline product was collected by filtration. The crude 2,4-dinitrophenylhydrazone melted at 184.5–187.5° C. After recrystallization from fifty volume percent ethanol-acetone, the melting point was 188–189° C. An additional recrystallization from a boiling solution of ethyl acetate and acetone yielded a highly purified 2,4-dinitrophenylhydrazone which melted at 189.5–190.5° C.

EXAMPLE 4

The reaction between crotonaldehyde and succinimide 6.3 g. of succinimide were added to an alcoholic solution containing 60 cc. of absolute ethanol and 0.01 g. of sodium. The above reaction mixture was cooled to 27° C. and then 5.5 cc. of crotonaldehyde (redistilled) were added dropwise over a 10-minute period. The reaction temperature was maintained at 27° C. After one-half hour, a clear solution resulted. After standing for an additional hour, the reaction mixture was acidified with 20 drops of glacial acetic acid. After acidification, the reaction mixture was concentrated in vacuo to yield a syrupy solid. 25 cc. of absolute ethanol were added, and the resulting reaction mixture was filtered. A portion of this alcoholic solution of the aldehydo compound was treated with 2,4-dinitrophenylhydrazine in the usual manner. The precipitated product was collected by filtration and washed with a small amount of 95% ethanol. The product thus obtained melted at 165–167° C. The crystalline product was recrystallized by dissolving in 6 cc. of boiling acetone. After filtration, the acetone filtrate was diluted with 50 cc. of ethyl acetate. The crystalline product which had been deposited was collected by filtration and melted at 165–166° C. This product was analyzed.

*Analysis.* Calc. for: N 20.06; Found; N 20.32.

The beta-imidopropionaldehydes thus obtained are suitable for use in the preparation of amino acids and other products. These reactions are indicated as follows:

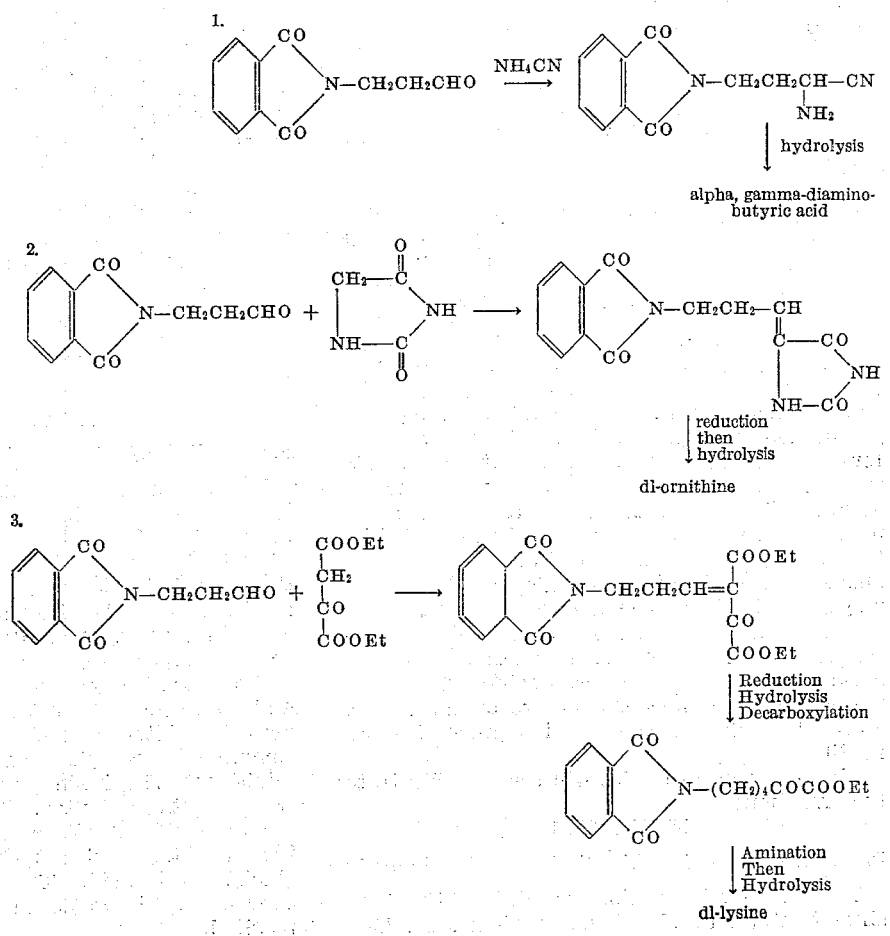

4.

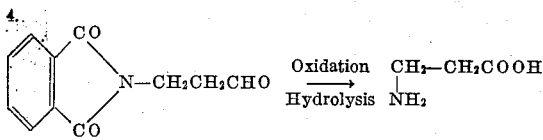

5.

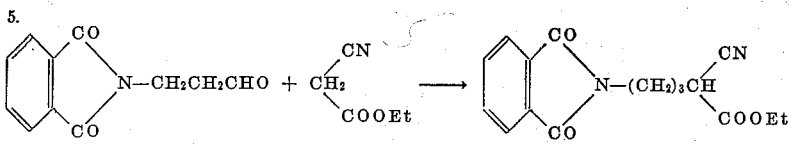

It is evident that the product of the reaction immediately above may be used for the synthesis of numerous products, and can readily be converted to omega-amino carboxylic acids.

While various modifications of the above invention have been described, it is to be understood that the invention is not limited thereto, but may be varied within the scope of the following claims.

We claim as our invention:

1. Aldehydo compounds having the following formula:

$$R^2=NCHRCHR^1CHO$$

in which R and $R^1$ are selected from the group consisting of hydrogen and lower alkyl, and in which $R^2=N$ is an imido radical selected from the group consisting of phthalimido and succinimido radicals.

2. Aldehydo compounds having the following formula:

$$R^2=NCHCH_3CHR^1CHO$$

in which $R^1$ is selected from the group consisting of hydrogen and lower alkyl, and in which $R^2=N$ is an imido radical selected from the group consisting of phthalimido and succinimido radicals.

3. Aldehydo compounds having the following formula:

$$R^2=NCHRCHCH_3CHO$$

in which R is selected from the group consisting of hydrogen and lower alkyl, and in which $R^2=N$ is an imido radical selected from the group consisting of phthalimido and succinimido radicals.

4. Beta-succinimido butyraldehyde.
5. Beta-phthalimidopropionaldehyde.
6. Beta-succinimidopropionaldehyde.
7. Process of producing aldehydes having the formula $$R^2=NCHRCHR^1CHO$$

in which R and $R^1$ are selected from the group consisting of hydrogen and lower alkyl, and in which $R^2=N$ is an imido radical selected from the group consisting of phthalimido and succinimido radicals, which comprises adding an aldehyde selected from the group consisting of acrolein and alkyl-substituted acrolein, to an imide selected from the group consisting of phthalimide and succinimide, in the presence of an alkaline catalyst.

8. Process of producing beta-phthalimidopropionaldehyde which comprises adding acrolein to phthalimide in the presence of an alkaline catalyst.

9. Process of producing beta-succinimidopropionaldehyde which comprises adding acrolein to succinimide in the presence of an alkaline catalyst.

OWEN A. MOE.
DONALD T. WARNER.

REFERENCES CITED

The following references are of record in the file of this patent:

UNITED STATES PATENTS

| Number | Name | Date |
|---|---|---|
| 1,992,615 | Hoffman | Feb. 26, 1935 |
| 2,197,357 | Widmer et al. | Apr. 16, 1940 |
| 2,222,354 | Lichty | Nov. 19, 1940 |

FOREIGN PATENTS

| Number | Country | Date |
|---|---|---|
| 323,512 | Great Britain | Jan. 3, 1930 |
| 880,185 | France | Dec. 18, 1942 |

OTHER REFERENCES

Galat, J. Amer. Chem. Soc., vol. 67 (Aug. 1945), pages 1414 to 1415.